(12) United States Patent
Ziche

(10) Patent No.: US 7,321,019 B2
(45) Date of Patent: Jan. 22, 2008

(54) DISPERSIONS CONTAINING ORGANOPOLYSILOXANE/POLYUREA COPOLYMERS

(75) Inventor: Wolfgang Ziche, Diera-Zehren (DE)

(73) Assignee: Wacker Chemie AG, Munich (DE)

( * ) Notice: Subject to any disclaimer, the term of this patent is extended or adjusted under 35 U.S.C. 154(b) by 211 days.

(21) Appl. No.: 11/007,133

(22) Filed: Dec. 8, 2004

(65) Prior Publication Data

US 2005/0137327 A1 Jun. 23, 2005

(30) Foreign Application Priority Data

Dec. 18, 2003 (DE) ................................ 103 59 704

(51) Int. Cl.
*C08G 77/26* (2006.01)
(52) U.S. Cl. .................... 528/38; 427/387; 524/837; 525/474
(58) Field of Classification Search ............... 427/387; 524/837; 528/38; 525/474
See application file for complete search history.

(56) References Cited

U.S. PATENT DOCUMENTS

| 2,852,494 A * | 9/1958 | Lehmann et al. ............ 528/57 |
| 2003/0176613 A1 | 9/2003 | Hohberg et al. |

FOREIGN PATENT DOCUMENTS

| DE | 1 184 946 B | 10/1962 |
| DE | 1 178 586 B | 12/1962 |
| DE | 14 95 745 | 9/1963 |
| DE | 17 70 068 | 3/1968 |
| DE | 1 946 942 | 9/1968 |
| DE | 20 19 324 | 4/1970 |
| DE | 24 46 440 | 9/1974 |
| DE | 28 07 861 | 2/1978 |
| DE | 44 13 562 | 4/1994 |
| DE | 199 58 525 | 12/1999 |
| EP | 0 380 236 | 8/1990 |
| EP | 1 201 699 | 8/2001 |
| EP | 1 336 683 | 8/2003 |
| WO | WO 03/014180 | 2/2003 |
| WO | WO 03/097757 | 11/2003 |

OTHER PUBLICATIONS

Yilgor, I. et al, "Segmented Organosiloxane Copolymers—Synthesis of Siloxane-Urea Copolymers," POLYMER, Dec. 1985, vol. 25, pp. 1800-1806.
Derwent Abstract corresponding to DE 1 184 946.
Derwent Abstract corresponding to DE 1 178 586.
Derwent Abstract corresponding to DE 14 95 745.
Derwent Abstract corresponding to DE 20 19 324.
Derwent Abstract corresponding to DE 28 07 861.
Derwent Abstract corresponding to DE 17 70 068.
Derwent Abstract corresponding to DE 24 46 440.
Derwent Abstract corresponding to DE 199 58 525.
Derwent Abstract corresponding to DE 44 13 562.
Derwent Abstract corresponding to DE 1 946 942.
Derwent Abstract corresponding to EP 1 201 699.

* cited by examiner

*Primary Examiner*—Kuo-Liang Peng
(74) *Attorney, Agent, or Firm*—Brooks Kushman P.C.

(57) ABSTRACT

Aqueous dispersions containing organopolysiloxane/polyurea copolymers prepared by reacting aminoalkyl-functional organopolysiloxanes with a diisocyanate in water in the presence of a protonating acid, and optionally one or more surfactants and/or protective colloids. The organopolysiloxane/polyurea polymers may be prepared without the presence of ionic groups if desired.

5 Claims, No Drawings

DISPERSIONS CONTAINING ORGANOPOLYSILOXANE/POLYUREA COPOLYMERS

BACKGROUND OF THE INVENTION

1. Field of the Invention

The invention relates to aqueous dispersions containing organopolysiloxane/polyurea copolymers and a process for the preparation thereof.

2. Background Art

Aqueous polyurethane/polyurea dispersions and processes for their preparation are known. In this context, reference may be made, for example, to DE 11 84 946 B, DE 11 78 586 B, DE 14 95 745 C3, DE 20 19 324 C3 and DE 28 07 861 A1. The dispersions described therein are prepared based on the principle of incorporating hydrophilic centers into a macromolecular chain of a polyurethane/polyurea molecule. These hydrophilic centers, or internal emulsifiers as they are referred to, are ionic groups or ether groups in these dispersions. The ionic groups are either incorporated into the prepolymer in the form of specially functionalized diols or are used in the form of modified amines for chain extension of the prepolymers, which each have at least two terminal NCO groups.

Dispersions which are prepared using organic solvents during polyaddition have the disadvantage that the organic solvent has to be distilled off and recycled by a relatively complicated procedure. Solvent-free processes for the preparation of polyurethane dispersions are also known, for example the so-called melt dispersing process disclosed in DE 17 70 068 C3, in which an oligourethane modified with ionic groups is used. This process is suitable in particular for the preparation of cationically modified polyurethanes or for the preparation of anionic polyurethanes containing carboxylate groups. The required combination of process steps, e.g. isocyanate polyaddition and chain extension constitute a considerable disadvantage to such synthetic methods.

Employing prepolymers containing both sulfonate and NCO groups, polyaddition reactions involving the NCO groups with difunctional compounds reactive with NCO groups may be carried out while dispersing the reactants in a dispersing medium. In this context, reference may be made, for example, to DE 2 446 440 C3. A disadvantage of this process is that only polymers containing sulfonate groups may be obtained.

DE 199 58 525 A1 discloses dispersions which are obtained from silyl-functional polymers. A disadvantage is that the special polymers have to be synthesized in a separate step. Polyurethane dispersions having disiloxane groups are disclosed in DE 44 13 562 A1. Here too, a special synthesis of prepolymers is required, and in addition, the siloxane content is extremely low. The preparation of polyureas by interfacial polyaddition according to DE 19 46 942 A, starting from monomeric diisocyanates and diamines in aqueous solution, is known. However, the use of siloxane-containing polymers in this process is not suggested.

Organopolysiloxane/polyurea block copolymers are known and are prepared from aminoalkyl-terminated siloxanes and diisocyanates. In this context, reference may be made, for example, to *Polymer*, Vol. 25 (1984), page 1800 et seq. Advantageous properties of these products are an obtainable high siloxane content (>90%) and their thermoplasticity. A disadvantage is that they are once again readily dispersible only by the incorporation of ionic, polar, or hydrophilic groups, e.g. polyethers, so that properties of the underivatized organopolysiloxane/polyurea block copolymers are largely lost.

SUMMARY OF THE INVENTION

It has now been surprisingly discovered that stable aqueous dispersions of organopolysiloxane/polyurea polymers may be prepared by reacting aminoalkyl-functional organopolysiloxanes with diisocyanates in aqueous dispersion also containing a Brönsted acid, and preferably, one or more surfactants and/or protective colloids.

DETAILED DESCRIPTION OF THE PREFERRED EMBODIMENT(S)

The invention thus relates to aqueous dispersions containing organopolysiloxane/polyurea copolymers of the formula $$R^3-[(A)_a(B)_b]-R^3 \qquad (I),$$

in which (A) is a radical of the formula

$$-[NH-Z-NH-CO-ND-Y-SiR_2-(O-SiR_2)_r-O-SiR_2-Y-ND-CO]- \qquad (II)$$

and (B) a radical of the formula

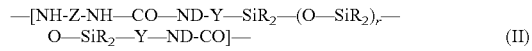

$$-[NH-Z-NH-CO-E-X-E-CO]- \qquad (III)$$

in which

X are identical or different $C_{1-700}$ alkylene radicals optionally substituted by fluorine, chlorine, $C_1$-$C_6$ alkyl or $C_1$-$C_6$ alkyl ester in which non-adjacent methylene units are optionally replaced by —O—, —COO—, —OCO— or —OCOO— groups, or by optionally substituted $C_{6-22}$ arylene radicals, Y are identical or different $C_{1-30}$ hydrocarbon radicals in which non-adjacent methylene units are optionally replaced by —O— groups, Z are identical or different divalent $C_{1-30}$ hydrocarbon radicals optionally substituted by fluorine or chlorine, D are identical or different and are hydrogen, an optionally substituted hydrocarbon radical, or an —$R_2Si$—X—$NH_2$ radical, E are identical or different and are oxygen or an amino group —$NR^2$—, R are identical or different and are a monovalent $C_{1-20}$ hydrocarbon radical optionally substituted by fluorine or chlorine, or an —$OR^4$ radical in which $R^4$ has the same meaning as that given for $R^2$, $R^2$ are identical or different and are hydrogen or a $C_{1-22}$ hydrocarbon radical, $R^3$ are identical or different and are an —NH-Z-NCO, an —CO-E-X-E-H or an —CO—ND-Y—$SiR_2$—(O—$SiR_2)_r$—O—$SiR_2$—Y—NDH radical, preferably —CO-E-X-E-H or —CO—ND-Y—$SiR_2$—(O—$SiR_2)_r$—O—$SiR_2$—Y—NDH, r is 0 or an integer from 1 to 4000, preferably from 30 to 4000, most preferably from 40 to 3000, a is an integer greater than 1 and b is 0 or an integer from 1 to 2000, preferably 0, wherein the individual blocks (A) and (B) may be randomly distributed ($R^3$-[(A)$_a$-stat-(B)$_b$]—$R^3$). "Stat" indicates a statistical distribution produced by random polymerization. Of course, non-random distributions may also be prepared. In the context of the present invention, the term organopolysiloxanes is intended to include polymeric, oligomeric and dimeric siloxanes.

Examples of divalent radicals Z are alkylene radicals such as the methylene, ethylene, n-propylene, isopropylene, n-butylene, isobutylene, tert-butylene, n-pentylene, isopentylene, neopentylene, and tert-pentylene radicals, hexylene radicals such as the n-hexylene radical, heptylene radicals such as the n-heptylene radical, octylene radicals such as the n-octylene radical and isooctylene radicals such as the 2,2,4-trimethylpentylene radical, nonylene radicals such as the n-nonylene radical, decylene radicals such as the n-decylene radical, dodecylene radicals, such as the n-dodecylene radical; alkenylene radicals, such as the vinylene and the allylene radicals; cycloalkylene radicals such as the cyclopentylene, cyclohexylene, cycloheptylene and methylcyclohexylene radicals; arylene radicals such as the phenylene and the naphthylene radicals; alkarylene radicals such as o-, m- and p-tolylene radicals, xylylene radicals and ethylphenylene radicals; and aralkylene radicals such as the benzyl radical and the α- and the β-phenylethylene radicals.

Radical Z preferably are alkylene groups having 1 to 24 carbon atoms, most preferably the hexylene, 4,4'-methylenebiscyclohexylene and 3-methylene-3,5,5-trimethylcyclohexylene radicals.

Examples of the radical Y are the examples disclosed for Z. Radical Y is preferably an alkylene radical having 1 to 30 carbon atoms in which nonneighboring methylene units are optionally replaced by —O— groups, or is an arylene radical having 6 to 22 carbon atoms. Most preferably, radical Y is an alkylene group having 1 to 3 carbon atoms, most preferably having 3 carbon atoms.

Examples of radical X are the butylene radical, the ethylene radical, the hexylene radical, —$(CH_2)_3$—(O—CH$(CH_3)$—$CH_2)_{2-3000}$—O—$(CH_2)_3$—, —$CH(CH_3)$—$CH_2$—(O—$CH(CH_3)$—$CH_2)_{2-3000}$—, —$(CH_2)_3$—(O—$CH_2CH_2)_{2-300}$—O—$(CH_2)_3$— and —$CH_2$—$CH_2$—(O$CH_2CH_2)_{2-300}$—. Radical X is preferably a polyether radical, more preferably a polypropylene glycol radical, most preferably one having 2 to 600 carbon atoms.

Examples of radicals R and $R^2$ are, in each case, independently of one another, alkyl radicals such as the methyl, ethyl, n-propyl, isopropyl, n-butyl, isobutyl, tert-butyl, n-pentyl, isopentyl, neopentyl and tert-pentyl radicals, hexyl radicals such as the n-hexyl radical, heptyl radicals such as the n-heptyl radical, octyl radicals such as the n-octyl radical and isooctyl radicals such as the 2,2,4-trimethylpentyl radical, nonyl radicals such as the n-nonyl radical, decyl radicals such as the n-decyl radical, dodecyl radicals, such as the n-dodecyl radical; alkenyl radicals such as the vinyl and the allyl radical; cycloalkyl radicals such as the cyclopentyl, cyclohexyl, cycloheptyl and methylcyclohexyl radicals; aryl radicals such as the phenyl and the naphthyl radical; alkaryl radicals such as o-, m- and p-tolyl radicals, xylyl radicals and ethylphenyl radicals; and aralkyl radicals such as the benzyl radical and the α- and the β-phenylethyl radical.

Further examples of radical R are alkoxy radicals such as the methoxy, ethoxy and methoxyethoxy radicals. Radical R is preferably a hydrocarbon radical having 1 to 6 carbon atoms, more preferably an alkyl radical having 1 to 4 carbon atoms, in particular the methyl radical.

Radical $R^2$ is preferably a hydrogen atom or a methyl, ethyl, phenyl or cyclohexyl radical, a hydrogen atom and the methyl radical being particularly preferred.

Examples of hydrocarbon radicals D are the radicals disclosed above for R. Radical D is preferably an alkyl radical or a hydrogen atom, particularly preferably a hydrogen atom or an alkyl radical having 1 to 12 carbon atoms, in particular a hydrogen atom.

Radical E is preferably an oxygen atom or nitrogen atom, most preferably an oxygen atom. In the organopolysiloxane/polyurea copolymers, a is preferably an integer from 1 to 1000, more preferably from 5 to 1000.

Examples of radicals $R^3$ are radicals which derive from the unreacted terminal groups from the starting materials used, for example, —NH—$(CH_2)_6$—NCO, —CO—O—$(CH_2)_4$—OH, —CO—NH—$(CH_2)_2$—$NH_2$, —CO—NH—$(CH_2)_3$—$Si(CH_3)_2$—(O—$Si(CH_3)_2)_{40}$—O—$Si(CH_3)_2$—$(CH_2)_3$—$NH_2$ and —CO—NH—$(CH_2)$—$Si(CH_3)_2$—(O—$Si(CH_3)_2)_{15}$—O—$Si(CH_3)_2$—$(CH_2)$—$NH_2$ radicals.

The copolymers of the formula (I) are preferably those having b=0, wherein exclusively siloxane chains are present and hence the advantages of these polymers, such as transparency, UV stability and low surface energies, are maximized.

Examples of copolymers of the formula (I) are OCN—$(CH_2)_6$—NH—{[CO—NH—$(CH_2)_3$—$Si(CH_3)_2$—(O—Si$(CH_3)_2)_{100}$—O—$Si(CH_3)_2$—$(CH_2)_3$—NH—CO—NH—$(CH_2)_6$—NH]$_{50}$-stat-[CO—O—$(CH_2)_4$—O—CO—NH—$(CH_2)_6$—NH]$_{10}$}—CO—NH—$(CH_2)_6$—NCO, OCN—$(C_6H_{10}$—$CH_2$—$C_6H_{10})$—NH—{[CO—NH—$(CH_2)_3$—Si$(CH_3)_2$—(O—$Si(CH_3)_2)_{100}$—O—$Si(CH_3)_2$—$(CH_2)_3$—NH—CO—NH—$(C_6H_{10}$—$CH_2$—$C_6H_{10})$—NH]$_{50}$-stat-[CO—NH—$(CH_2)_2$—NH—CO—NH—$[C_6H_{10}$—$CH_2$—$C_6H_{10})$—NH]$_{10}$}—CO—NH—$(C_6H_{10}$—$CH_2$—$C_6H_{10})$—NCO, $H_2N$—$(CH_2)_3$—$Si(CH_3)_2$—(O—$Si(CH_3)_2)_{40}$—O—$Si(CH_3)_2$—$(CH_2)_3$—NH—CO—{[NH—$(CH_2)_6$—NH—CO—NH—$(CH_2)_3$—$Si(CH_3)_2$—(O—$Si(CH_3)_2)_{40}$—O—Si$(CH_3)_2$—$(CH_2)_3$—NH—CO]$_{50}$}—NH—$(CH_2)_6$—NH—$(CH_2)_3$—$Si(CH_3)_2$—(O—$Si(CH_3)_2)_{40}$—O—$Si(CH_3)_2$—$(CH_2)_3$—$NH_2$, $H_2N$—$(CH_2)_3$—$Si(CH_3)_2$—(O—Si$(CH_3)_2)_{40}$—O—$Si(CH_3)_2$—$(CH_2)_3$—NH—CO—{[NH—$(CH_2)_6$—NH—CO—NH—$(CH_2)_3$—$Si(CH_3)_2$—(O—Si$(CH_3)_2)_{40}$—O—$Si(CH_3)_2$—$(CH_2)_3$—NH—CO]$_{50}$-stat-[NH—$(CH_2)_6$—NH—CO—O—$(CH_2)_4$—O—CO]$_{10}$}—NH—$(CH_2)_6$—NH—CO—NH—$(CH_2)_3$—$Si(CH_3)_2$—(O—$Si(CH_3)_2)_{40}$—O—$Si(CH_3)_2$—$(CH_2)_3$—$NH_2$, $H_2N$—$(CH_2)_2$—NH—CO—{[NH—$(CH_2)_6$—NH—CO—NH—$(CH_2)_3$—$Si(CH_3)_2$—(O—$Si(CH_3)_2)_{40}$—O—$Si(CH_3)_2$—$(CH_2)_3$—NH—CO]$_{50}$}—NH—$(CH_2)_6$—NH—$(CH_2)_2$—$NH_2$, HO—$(CH_2)_4$—O—CO—{[NH—$(CH_2)_6$—NH—CO—NH—$(CH_2)_3$—$Si(CH_3)_2$—(O—$Si(Ch_3)_2)_{40}$—O—Si$(CH_3)_2$—$(CH_2)_3$—NH—CO]$_{50}$-stat-[NH—$(CH_2)_6$—NH—CO—O—$(CH_2)_4$—O—CO]$_{10}$}—NH—$(CH_2)_6$—NH—CO—O—$(CH_2)_4$—OH, $H_2N$—$(CH_2)_3$—$Si(CH_3)_2$—(O—$Si(CH_3)_2)_{40}$—O—$Si(CH_3)_2$—$(CH_2)_3$—NH—CO—{[NH—$(C_6H_{10}$—$CH_2$—$C_6H_{10})$—NH—CO—NH—$(CH_2)_3$—$Si(CH_3)_2$—(O—$Si(CH_3)_2)_{40}$—O—$Si(CH_3)_2$—$(CH_2)_3$—NH—CO]$_{50}$}—NH—$(C_6H_{10}$—$CH_2$—$C_6H_{10})$—NH—$(CH_2)_3$—$Si(CH_3)_2$—(O—$Si(CH_3)_2)_{40}$—O—$Si(CH_3)_2$—$(CH_2)_3NH_2$ and $H_2N$—$(CH_2)_3$—$Si(CH_3)_2$—(O—$Si(CH_3)_2)_{40}$—O—Si$(CH_3)_2$—$(CH_{23}$—NH—CO—{[NH—$(CH_6H_{10}$—$CH_2$—$C_6H_{10})$—NH—CO—NH—$(CH_2)_3$—$Si(CH_3)_2$—(O—Si$(CH_3)_2)_{40}$—O—$Si(CH_3)_2$—$(CH_2)_3$—NH—CO—]$_{50}$-stat-[NH—$(C_6H_{10}$—$CH_2$—$C_6H_{10})$—NH—CO—O—$(CH_2)_4$—O—CO]$_{10}$}—NH—$(C_6H_{10}$—$CH_2$—$C_6H_{10})$—NH—CO—NH—$(CH_2)_3$—$Si(CH_3)_2$—(O—$Si(CH_3)_2)_{40}$—O—Si$(CH_3)_2$—$(CH_2)_3$—$NH_2$; $H_2N$—$(CH_2)_3$—$Si(CH_3)_2$—(O—Si$(CH_3)_2)_{40}$—O—$Si(CH_3)_2$—$(CH_2)_3$—NH—CO—{[NH— $(CH_2)_6$—NH—CO—NH—$(CH_2)_3$—$Si(CH_3)_2$—(O—$Si(CH_3)_2)_{40}$—O—$Si(CH_3)_2$—$(CH_2)_3$—NH—CO]$_{50}$}

—NH—$(CH_2)_6$—NH—$(CH_2)_3$—Si$(CH_3)_2$—(O—Si$(CH_3)_2)_{40}$—O—Si$(CH_3)_2$—$(CH_2)_3$—$NH_2$, $H_2N$—$(CH_2)_3$—Si$(CH_3)_2$—(O—Si$(CH_3)_2)_{40}$—O—Si$(CH_3)_2$—$(CH_2)_3$—NH—CO—{[NH—$(CH_2)_6$—NH—CO—NH—$(CH_2)_3$—Si$(CH_3)_2$—(O—Si$(CH_3)_2)_{40}$—O—Si$(CH_3)_2$—$(CH_2)_3$—NH—CO]$_{50}$-stat-[NH—$(CH_2)_6$—NH—CO—O—$(CH_2)_4$—O—CO]$_{10}$}—NH—$(CH_2)_6$—NH—CO—NH—$(CH_2)_3$—Si—$(CH_3)_2$—(O—Si$(CH_3)_2)_{40}$—O—Si$(CH_3)_2$—$(CH_2)_3$—$NH_2$, $H_2N$—$(CH_2)_3$—Si$(CH_3)_2$—(O—Si$(CH_3)_2)_{40}$—O—Si$(CH_3)_2$—$(CH_2)_3$—NH—CO—{[NH—$(C_6H_{10}$—$CH_2$—$C_6H_{10})$—NH—CO—NH—$(CH_2)_3$—Si$(CH_3)_2$—(O—Si$(CH_3)_2)_{40}$—O—Si—$(CH_3)_2$—$(CH_2)_3$—NH—CO]$_{50}$}—NH—$(C_6H_{10}$—$CH_2$—$C_6H_{10})$—NH—$(CH_2)_3$—Si$(CH_3)_2$—(O—Si$(CH_3)_2)_{40}$—O—Si$(CH_3)_2$—$(CH_2)_3$—$NH_2$ and $H_2N$—$(CH_2)_3$—Si$(CH_3)_2$—(O—Si$(CH_3)_2)_{40}$—O—Si$(CH_3)_2$—$(CH_2)_3$—NH—CO—{[NH—$(C_6H_{10}$—$CH_2$—$C_6H_{10})$—NH—CO—NH—$(CH_2)_3$—Si$(CH_3)_2$—(O—Si$(CH_3)_2)_{40}$—O—Si$(CH_3)_2$—$(CH_2)_3$—NH—CO]$_{50}$-stat-[NH—$(C_6H_{10}$—$CH_2$—$C_6H_{10})$—NH—CO—O—$(CH_2)_4$—O—CO]$_{10}$}—NH—$(C_6H_{10}$—$CH_2$—$C_6H_{10})$—NH—CO—NH—$(CH_2)_3$—Si$(CH_3)_2$—(O—Si$(CH_3)_2)_{40}$—O—Si$(CH_3)_2$—$(CH_2)_3$—$NH_2$, being preferred, and $H_2N$—$(CH_2)_3$—Si$(CH_3)_2$—Si$(CH_3)_2)_{40}$—O—Si$(CH_3)_2$—$(CH_2)_3$—NH—CO—{[NH—$(CH_2)_6$—NH—CO—NH—$(CH_2)_3$—Si$(CH_3)_2$—(O—Si$(CH_3)_2)_{40}$—O—Si$(CH_3)_2$—$(CH_2)_3$—NH—CO]$_{50}$}—NH—$(CH_2)_6$—NH—$(CH_2)_3$—Si$(CH_3)_2$—(O—Si$(CH_3)_2)_{40}$—O—Si$(CH_3)_2$—$(CH_2)_3$—$NH_2$ and $H_2N$—$(CH_2)_3$—Si$(CH_3)_2$—(O—Si$(CH_3)_2)_{40}$—O—Si$(CH_3)_2$—$(CH_2)_3$—NH—CO—{[NH—$(C_6H_{10}$—$CH_2$—$C_6H_{10})$—NH—CO—NH—$(CH_2)_3$—Si$(CH_3)_2$—(O—Si$(CH_3)_2)_{40}$—O—Si$(CH_3)_2$—$(CH_2)_3$—NH—CO]$_{50}$}—NH—$(C_6H_{10}$—$CH_2$—$C_6H_{10})$—NH—$(CH_2)_3$—Si$(CH_3)_2$—(O—Si$(CH_3)_2)_{40}$—O—Si$(CH_3)_2$—$(CH_2)_3$—$NH_2$, being particularly preferred.

The copolymers of the formula (I) preferably have a siloxane content of, more than 70% by weight, more preferably more than 80% by weight, based in each case on the total weight of the copolymer, and preferably have no ionic groups within the molecule. The copolymers of the formula (I) which are contained in the dispersions preferably have an inherent viscosity of less than 2.0 g/dl (measured in chloroform).

In addition to the copolymers of the formula (I) and water, the dispersions may contain all further substances which have also been used to date for the preparation of aqueous dispersions, for example, emulsifiers and protective colloids.

Examples of emulsifiers are all emulsifiers known per se, such as anionic, nonionic, cationic and ampholytic emulsifiers.

Examples of nonionic emulsifiers are:

1. Polyvinyl alcohols which still have from 5 to 50%, preferably from 8 to 20%, of vinyl acetate units, having a degree of polymerization of from 500 to 3000.

2. Alkylpolyglycol ethers, preferably those having 8 to 40 EO units and alkyl radicals of 8 to 20 carbon atoms.

3. Alkylarylpolyglycol ethers, preferably those having 8 to 40 EO units and 8 to 20 carbon atoms in the alkyl and aryl radicals.

4. Linear organo(poly)siloxanes containing polar groups, in particular those having alkoxy groups having up to 24 carbon atoms and/or up to 40 EO and/or PO groups.

Examples of cationic emulsifiers are:

5. Quaternary alkyl- and alkylbenzeneammonium salts, in particular those whose alkyl groups have 6 to 24 carbon atoms, in particular the halides, sulfates, phosphates and acetates.

6. Alkylpyridinium, alkylimidazolinium and alkyloxazolinium salts, in particular those whose alkyl chain has up to 18 carbon atoms, especially the halides, sulfates, phosphates and acetates.

Polyvinyl alcohol and alkylpolyglycol ethers are preferably used as emulsifiers in the dispersions according to the invention.

The aqueous dispersion according to the invention contains emulsifiers in amounts of from 1 to 10% by weight, more preferably from 1 to 5% by weight, based in each case on the total weight of copolymers and water.

Examples of protective colloids are polyvinyl alcohols which still have from 5 to 50%, preferably from 8 to 20%, of vinyl acetate units, having a degree of polymerization of from 500 to 3000; cellulose ethers; polyacrylates; polyvinylpyrrolidone; starches; proteins; and high-polymer natural substances such as alginates and vegetable gums.

The dispersions preferably have a solids content of from 10 to 80 percent by weight, more preferably from 25 to 60 percent by weight, and have the advantage that they are free of ionic groups. The dispersions have the further advantage that, during use, they have ecological advantages over copolymers of the same type which are dissolved in organic solvents.

The present invention furthermore relates to a process for the preparation of the dispersions according to the invention, wherein (a) amino-terminated organopolysiloxane(s), (b) diisocyanate(s), (c) water, (d) Brönsted acid(s), optionally (e) surface-active agent(s), (f) base(s), optionally (g) polyfunctional amines which differ from (a), and optionally, (h) polyfunctional isocyanates which differ from (b) are reacted with one another.

Component (a) is preferably used in an amount such that the resulting copolymer of the formula (I) preferably has a siloxane content of more than 70% by weight, more preferably more than 80% by weight, based in each case on the total weight of the copolymer.

According to a preferred embodiment of the process according to the invention, in a first step, (a) is dispersed, optionally as a mixture with (g), in (d) and (c), optionally with the aid of (e); in a second step, (b) and optionally (h) are added, it being possible, if desired, to disperse (b) and/or (h) before the addition in (c), optionally with the aid of (e); and in a third step, (f) is added in an amount which is sufficient to neutralize (d).

The component (a) used according to the invention is preferably an organopolysiloxane having at least two terminal amino groups reactive toward isocyanate, most preferably one of the formula $$H-ND-Y-SiR_2-(O-SiR_2)_r-OSiR_2-Y-ND-H \qquad (IV)$$

in which

R, D, Y and r have the abovementioned meanings.

Component (a) may be obtained as a commercial product or can be prepared by processes customary in silicon chemistry, for example according to the processes described in EP 1 201 699 A.

The component (b) used according to the invention may be any desired organic diisocyanate, most preferably a diisocyanate of the formula

OCN-Z-NCO    (V)

in which Z has the abovementioned meaning. Component(s) (b) are commercial products or can be prepared by processes customary in chemistry.

In the inventive process, components (a) and (b) are used in amounts such that the molar ratio of the amino groups in (a) which are reactive toward NCO groups to the isocyanate groups in (b) is preferably from 0.95:1 to 1.05:1, most preferably 1:1.

Advantageously, the reactivity of the isocyanates (b) toward water (c) is preferably low in comparison with the amines (a). Isocyanates $Y(NCO)_2$ in which Y is an aliphatic radical are therefore more preferably used.

The component (d) used according to the invention is preferably a protonating acid such as hydrochloric acid, sulfuric acid or acetic acid, hydrochloric acid and sulfuric acid being particularly preferred. Component (d) is used in amounts such that the molar ratio of the amino groups in (a) which are reactive toward NCO groups, to the protons in (d) is from 1:95 to 1:2, most preferably 1:1.

The component (e) which is optionally used in the process is preferably an emulsifier or protective colloid, or a cationic or nonionic surfactant, mixtures thereof being particularly preferred, in particular nonionic surfactants being most preferred. When component (e) is used, the amounts are preferably from 1 to 30 percent by weight, more preferably from 5 to 20 percent by weight, based in each case on the total weight of the components (a) and (b).

Bases (f) have the property of liberating the amino groups (a) which have been protonated by (d) for reaction with (b). The component (f) is preferably an inorganic base, for example, a sodium hydroxide or potassium hydroxide solution or sodium carbonate, sodium hydroxide and potassium hydroxide solutions being particularly preferred.

Component (g) optionally used in the process is preferably one of the formula

H-E-X-E-H    (VI)

in which E and X have the abovementioned meaning. If component (g) is used, which, however, is not preferred, the amounts are preferably from 10 to 40 percent by weight, more preferably from 10 to 20 percent by weight, based in each case on the total weight of components (a) and (b).

Component (h), which is optionally employed, is preferably triphenylmethane triisocyanate, 1-methylbenzene 2,4,6-triisocyanate, 1,3,5-trimethylbenzene 2,4,6-triisocyanate, naphthalene 1,3,7-triisocyanate, biphenyl 1,3,7-triisocyanate, diphenylmethane 2,4,4'-triisocyanate, 3-methyldiphenylmethane 4,6,4'-triisocyanate and condensates of hexamethylene diisocyanate (HDI) or of isophorone diisocyanate (IPDI) of the biuret type or trimer type (isocyanurate). If component (h) is used, which, however, is not preferred, the amounts are preferably from 1 to 10 percent by weight, more preferably from 1 to 5 percent by weight, based in each case on the total weight of components (a) and (b).

A substantial characteristic of the inventive process is that the amino groups in components (a) and (g) are used not as such, but in the form of amines which are at least partly protonated, preferably more than 90% protonated.

For carrying out the process, component (a), optionally as a mixture with component (g), is protonated with component (d) and dispersed in water (c), optionally with the use of surface-active agent (e), after which the isocyanates (b) and optionally (h) are added. The liberation of the protonated amines by addition of base (f) is preferably effected thereafter, so that a homogeneous mixture forms only by diffusion of the isocyanates into the emulsion particles.

The components used in the process may in each case be one type of such a component as well as a mixture of at least two types of a respective component.

The process is preferably carried out at temperatures of from 0 to 90° C., more preferably at from 20 to 50° C., and at a pressure of from 700 to 1500 hPa. All devices which are known to a person skilled in the art for producing dispersions, such as dissolver stirrers or rotor-stator mixers, can be used as mixers.

The process of the invention has the advantage that it is simple to carry out, and that homogeneous dispersions are obtained. Furthermore, the process has the advantage that dispersions of organopolysiloxane/polyurea block copolymers having a high siloxane content can be prepared free of ionic groups, and that no organic solvents are required for the procedure. The dispersions can be used for all purposes for which dispersions containing organopolysiloxane/polyurea copolymers have also been used to date. For such purposes, they can also be further processed and can be converted into formulations for the final intended use by the addition of, for example, fillers and additives, or by admixing with other dispersions. In particular, the dispersions are suitable for the coating of surfaces, impregnation of textiles, and for use alone or in conjunction with other ingredients as adhesives and sealants.

The present invention furthermore relates to a process for the coating of substrates, wherein the dispersions of the invention are applied to a substrate and the coated substrate is then dried. Application can be effected by spreading, spraying, application with a doctor blade, dipping, or by other methods known to the art. Drying may be effected at elevated temperature, i.e. at temperatures of from 80 to 250° C., and at atmospheric pressure. The substrates are preferably sheet-like textile structures, leather, paint surfaces and silicate building materials, most preferably sheet-like textile structures.

The coating of substrates (without drying) is preferably carried out at temperatures of, from 5 to 90° C., more preferably from 15 to 60° C., and preferably at a pressure of from 700 to 1500 hPa. The process for the coating of substrates has the ecological advantage that no copolymiers dissolved in organic solvents- are used.

In the examples described below, all data relating to parts expressed as percentages are based on weight, unless stated otherwise. Furthermore, all viscosity data are based on a temperature of 20° C. Unless stated otherwise, the following examples are carried out at atmospheric pressure, i.e. at about 1000 hPa, at room temperature, i.e. at about 20° C., or at a temperature which results on combining the reactants at room temperature without additional heating or cooling.

EXAMPLE 1

30 g of aminopropyl-terminated polydimethylsiloxane ($M_w$ about 3200 g/mol) are poured into a mixture of 210 ml of 0.1 N hydrochloric acid, 200 ml of water and 2.0 g of an ethoxylated C13-oxo alcohol (commercially available under the trade name Lutensol® TO5 from BASF AG, Germany) and dispersed using a high-speed stirrer (ULTRA-TURRAX®). Thereafter, 3.7 g of isophorone diisocyanate are added, and a solution of 0.83 g of NaOH in 100 mnl of water is then added rapidly dropwise and stirring is maintained for a further hour. A homogeneous, white, non-settling dispersion having a solids content of 6.7% is obtained. By further strong shearing (ULTRA-TURRAX®) of the dispersion thus obtained, the emulsion can be broken. Agglomeration of thermoplastic material then results after a few hours. The agglomerated material is soluble in polar organic solvents such as THF.

EXAMPLE 2

30 g of aminopropyl-terminated polydimethylsiloxane ($M_w$ about 3200 g/mol) are poured into a mixture of 210 ml of 0.1 N hydrochloric acid, 1.5 g of an ethoxylated C13-oxo alcohol (commercially available under the trade name Lutensol® TO5 from BASF AG, Germany) and 1.5 g of a 30% strength solution of a polyvinyl alcohol (commercially available under the name "POLYVIOL® solution LL 2960/1" from Wacker Polymer Systems GmbH & Co. KG, Burghausen, Germany) and dispersed using a high-speed stirrer (ULTRA-TURRAX®). Thereafter, 3.7 g of isophorone diisocyanate are added, a solution of 0.83 g of NaOH in 100 ml of water is then rapidly added dropwise and stirring is maintained for a further hour. A homogeneous dispersion is obtained; the solids content is 10.8%.

COMPARATIVE EXAMPLE 1

A thermoplastic siloxane/urea copolymer prepared in THF solution from aminopropyl-terminated polydimethylsiloxane ($M_w$ about 3200 g/mol) and isophorone diisocyanate in the molar ratio 1:1, having a softening point of 80° C., is heated to 100° C. in 200 ml of water and 2.0 g of an ethoxylated C13-oxo alcohol (commercially available under the trade name Lutensol® TO5 from BASF AG, Germany) with vigorous stirring. No dispersion is obtained.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A process for the preparation of an aqueous dispersion containing organopolysiloxane/polyurea copolymers of the formula $$R^3\text{-}[(A)_a(B)_b]\text{-}R^3 \quad (I),$$

in which (A) is a radical of the formula

—[NH-Z-NH—CO—ND-Y—$SiR_2$—(O—$SiR_2$)$_r$—O—$SiR_2$—Y—ND-CO]— (II)

and (B) a radical of the formula

—[NH-Z-NH—CO-E-X-E-CO]— (III)

in which

X are identical or different $C_{1-700}$ alkylene radicals optionally substituted by fluorine, chlorine, $C_1$-$C_6$-alkyl or $C_1$-$C_6$-alkyl ester in which non-adjacent methylene units are optionally replaced by —O—, —COO—, —OCO— or —OCOO— groups, or are optionally substituted $C_{6-22}$ arylene radicals, Y are identical or different $C_{1-30}$ hydrocarbon radicals in which non-adjacent methylene units are optionally replaced by —O— groups, Z are identical or different divalent $C_{1-30}$ hydrocarbon radicals optionally substituted by fluorine or chlorine, D are identical or different and are hydrogen, an optionally substituted hydrocarbon radical, or an —$R_2$Si—X—$NH_2$ radical, E are identical or different and are oxygen or an amino group —$NR^2$—, R are identical or different and are a monovalent $C_{1-20}$ hydrocarbon radical optionally substituted by fluorine or chlorine, or an —$OR^4$ radical in which $R^4$ has the same meaning as that given for $R^2$, $R^2$ are identical or different and are hydrogen or a $C_{1-22}$ hydrocarbon radical, $R^3$ are identical or different and are an —NH-Z-NCO, an —CO-E-X-E-H or an —CO—ND-Y—$SiR_2$—(O—$SiR_2$)$_r$—O—$SiR_2$—Y—NDH radical, r is 0 or an integer from 1 to 4000, a is an integer greater than 1 and b is 0 or an integer from 1 to 2000, wherein the individual blocks (A) and (B) are optionally randomly distributed ($R^3$-[$(A)_a$-stat-$(B)_b$]-$R^3$), comprising mixing (a) at least one amino-terminated organopolysiloxane,
(b) at least one diisocyanate,
(c) water,
(d) at least one Brönsted acid,
(e) optionally one or more surface-active agents,
(f) one or more bases,
(g) polyfunctional amines which differ from (a), and
(h) optionally one or more polyfunctional isocyanates which differ from (b), and reacting reactive species to form an organopolysiloxane/polyurea polymer.

2. The process of claim 1, wherein in a first step, (a), optionally as a mixture with (g), is dispersed in (d) and (c), optionally with the aid of (e), in a second step (b) and optionally (h) are added, (b) and/or (h) optionally in dispersed form before the addition in (c), optionally with the aid of (e), and in a third step, (f) is added in an amount which is sufficient to neutralize (d).

3. The process of claim 1, wherein component (a) is an organopolysiloxane having at least two terminal amino groups reactive toward isocyanate, of the formula H—ND-Y—$SiR_2$—(O—$SiR_2$)$_r$—$OSiR_2$—Y—ND-H   (IV).

4. The process of claim 1, wherein component (b) is a diisocyanate of the formula

OCN-Z-NCO   (V).

5. The process of claim 1 wherein said amino-terminated organopolysiloxane is dispersed in water containing a Brönsted acid and at least one surface active agent to form an amino-organopolysiloxane dispersion, neat diisocyanate is dispersed in said amino-organopolysiloxane dispersion, and base is added to neutralize said Brönsted acid.

* * * * *